United States Patent
Takauchi et al.

Patent Number: 5,453,333
Date of Patent: Sep. 26, 1995

[54] POROUS MEMBRANE HAVING SINGLE LAYER STRUCTURE, BATTERY SEPARATOR MADE THEREOF, PREPARATIONS THEREOF AND BATTERY EQUIPPED WITH SAME BATTERY SEPARATOR

[75] Inventors: Tsutomu Takauchi; Manabu Yamazaki; Yuichi Mori, all of Kanagawa, Japan

[73] Assignee: W. R. Grace & Co.-Conn., New York, N.Y.

[21] Appl. No.: 992,181

[22] Filed: Dec. 17, 1992

[30] Foreign Application Priority Data

Dec. 27, 1991 [JP] Japan .................. 3-358890
Dec. 27, 1991 [JP] Japan .................. 3-358891
Sep. 10, 1992 [JP] Japan .................. 4-268012
Sep. 10, 1992 [JP] Japan .................. 4-268013

[51] Int. Cl.⁶ .................................. H01M 2/16
[52] U.S. Cl. .................. 429/62; 429/142; 429/145; 429/249; 429/254
[58] Field of Search .................. 429/62, 142, 145, 429/249, 254

[56] References Cited

U.S. PATENT DOCUMENTS

| 4,075,400 | 2/1978 | Fritts ................. 429/62 |
| 4,217,404 | 8/1980 | Verzwyvelt ........... 429/200 |
| 4,650,730 | 5/1987 | Lundquist et al. . |
| 4,741,979 | 5/1988 | Faust et al. . |
| 4,812,375 | 3/1989 | Foster ................ 429/101 |
| 4,973,532 | 11/1990 | Taskier ............... 429/62 |

FOREIGN PATENT DOCUMENTS

| 0275152 | 1/1990 | Japan . |
| 0359947 | 3/1991 | Japan . |

Primary Examiner—José G. Dees
Assistant Examiner—Samuel Barts
Attorney, Agent, or Firm—Howard J. Troffkin

[57] ABSTRACT

A porous membrane of a single layer structure formed from a first polymer having a melting point of at least 130° C. and a second polymer having a melting point of up to 120° C., wherein the walls of the pores of the membrane have an amount of second polymer insufficient to block the permeability of the pores under normal operating temperature conditions yet sufficient to do so when the membrane reaches a temperature equal to or greater than the second polymer's melting point.

24 Claims, 5 Drawing Sheets

FIG. 1 – (a)
Before Heating
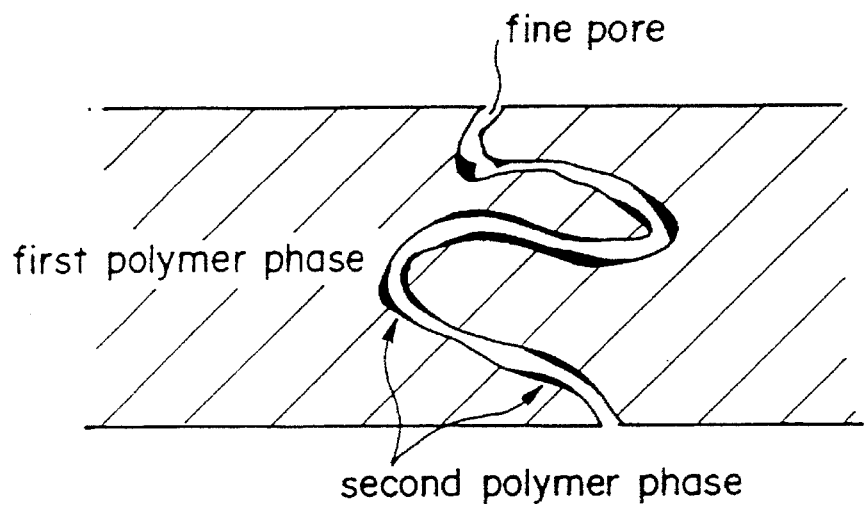
FIG. 1 – (b)
After Heating
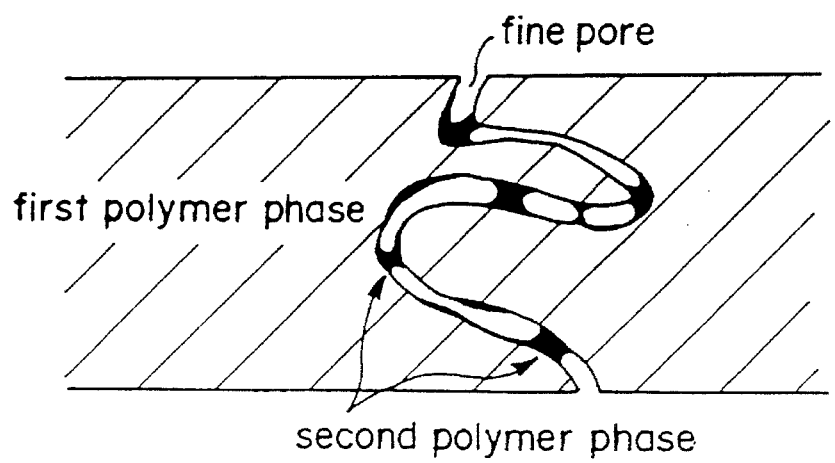

FIG. 4-(a)
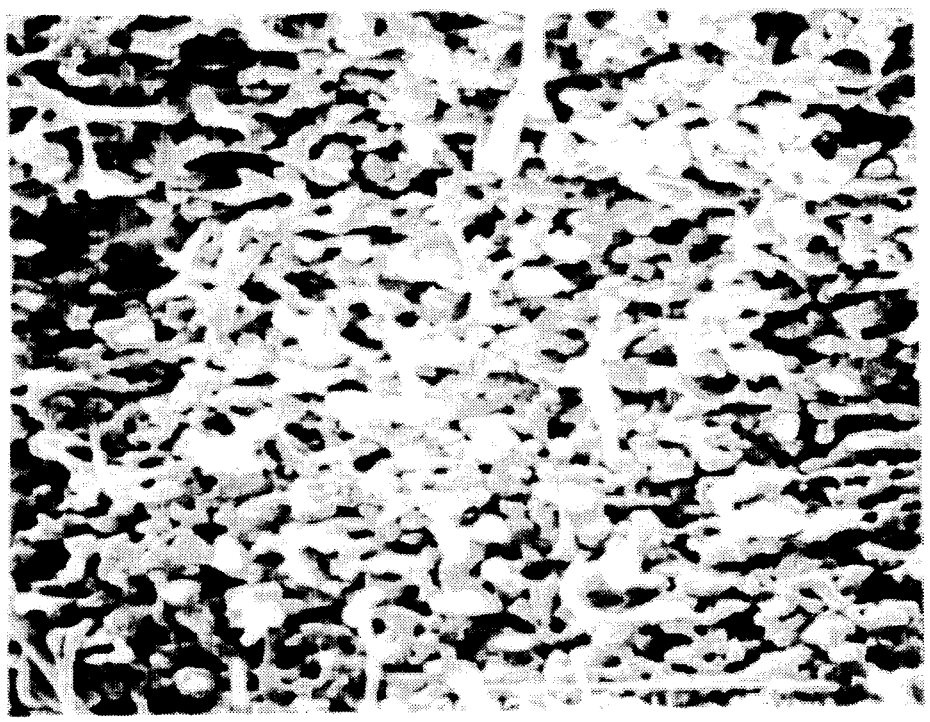
FIG. 4-(b)
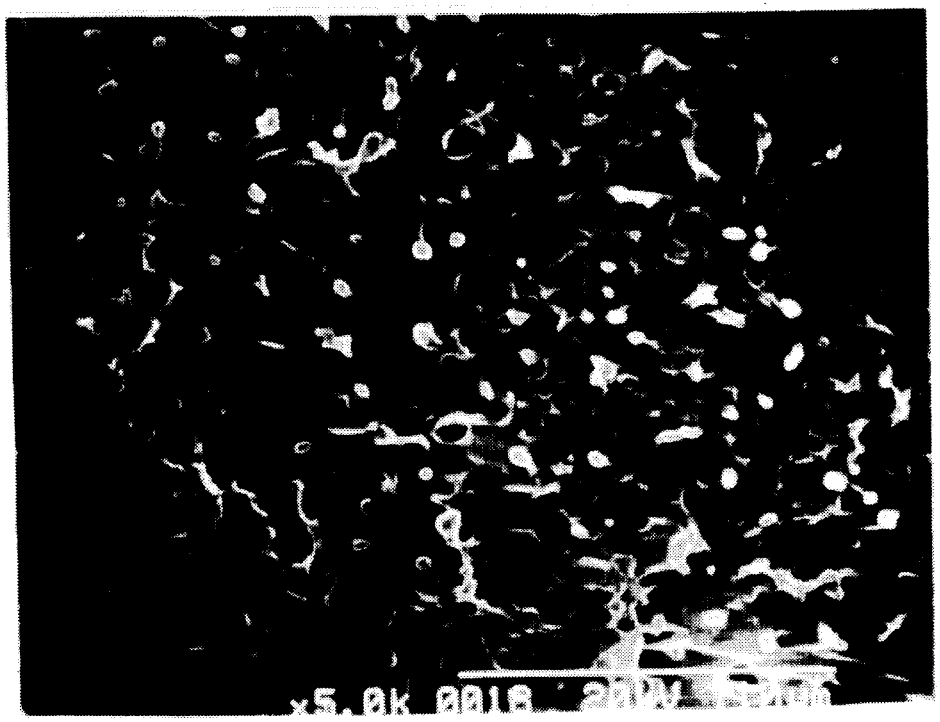

FIG. 5-(a)
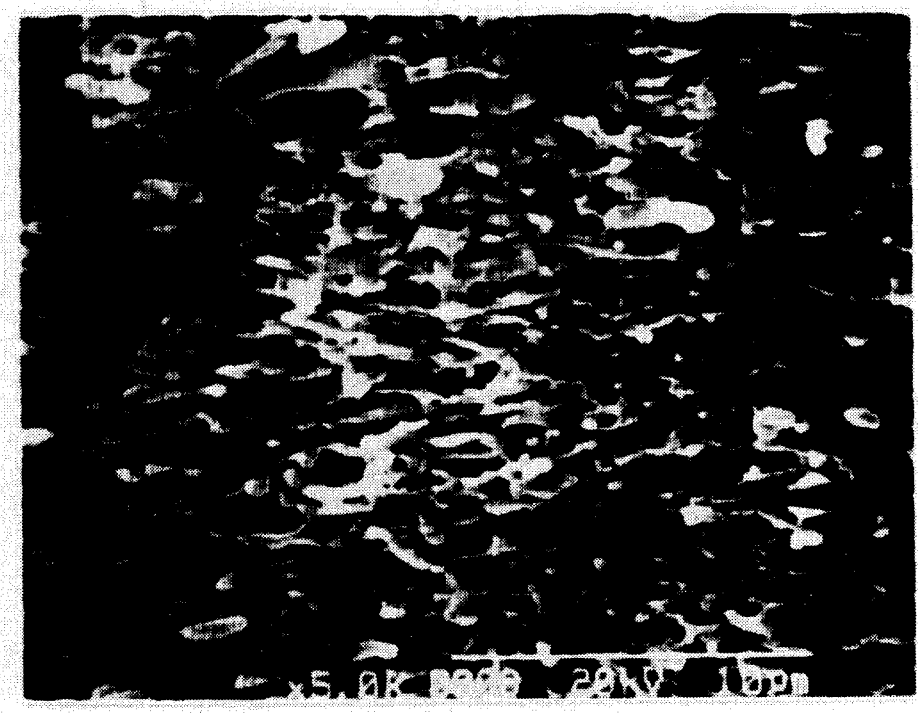
FIG. 5-(b)

FIG. 6-(a)
FIG. 6-(b)
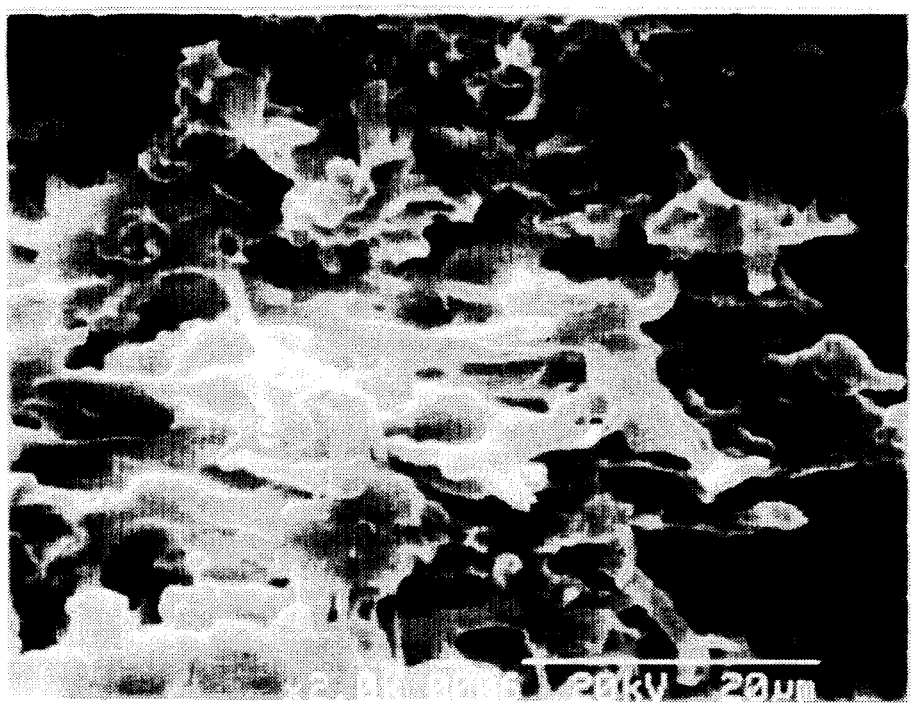

POROUS MEMBRANE HAVING SINGLE LAYER STRUCTURE, BATTERY SEPARATOR MADE THEREOF, PREPARATIONS THEREOF AND BATTERY EQUIPPED WITH SAME BATTERY SEPARATOR

BACKGROUND OF THE INVENTION

The present invention relates to a porous membrane having a single layer structure and a method of preparing the same. More particularly, it relates to a porous membrane capable of losing its permeability at a temperature equal to or higher than a prescribed temperature. The present invention also relates to a battery separator formed of the porous membrane and a battery equipped with the same.

Porous polymer membranes have been used in the field of filtration and separation technology. Various techniques have been used to impart certain desired characteristic features to such polymer membranes. For example, the membrane may be stretched in order to improve its strength. When it is to be used in filtration, the membrane may be treated with a surfactant to improve its affinity to filtering solutions. Ion exchange function have been imparted to membranes by grafting or copolymerizing various monomers having specific functional groups.

In certain applications, it is desired to have a porous polymer membrane which is capable of losing permeability above a prescribed temperature. For example, such a membrane would be highly desired as the separator component in rechargeable lithium secondary batteries. The membrane must have a property of permitting free passage of ions contained in the battery's electrolyte via passage through the membrane's porosity ("ion permeability" or "electrolytic conductivity") under normal operating conditions. However, such permeability must be sufficiently reduced to cause the electric current to shut down when the temperature within the battery rises beyond a certain point due to malfunctioning during the charging process or to short circuiting between the electrodes or for other reasons. If such electric current shut down is not achieved, the vapor of the solvent used in the electrolyte solution may cause excessive increase in pressure within the battery to create a danger, such as fire or explosion.

In the past, kraft paper or Manila hemp sheet material was used as a separator employed in conventional batteries, lithium batteries and capacitors. More recently, non-woven fabrics and porous polyolefin membranes having a high mechanical strength have been used for this purpose. However, these membranes do not exhibit the ability to reduce electrolytic conductivity to shut down the battery's current.

In particular, lithium batteries are designed to allow the flow of a high density current, and accordingly, the temperature within the battery will rapidly rise when short circuiting occurs between the electrodes. The short circuit causes an overcurrent which, in turn, accelerate chemical reaction at the anode. Rapid increase in temperature within the battery is extremely dangerous. If there is no protective mechanism, temperatures of 140° C. and greater may be quickly reached. This condition may cause the organic solvent used in the electrolyte solution to ignite or may even cause explosion of the battery. To avoid such dangers, a variety of countermeasures are presently needed. Because of the need for commercial products to be safe, there is an increased market demand to have a mechanism which can protect against such dangers.

One of the proposals to solve such a problem is to use, as a battery separator, a material which fuses and, thereby, becomes nonporous above its melting point. Under exothermic conditions, the separator would lose its ion permeability, resulting in preventing the flow of overcurrent. Polyolefins have been proposed as a material for such purposes. However, the mechanical strength of polyolefins decreases with decreased melting points. Thus, materials having sufficient strength to be suitable as the separator material are, for example, polypropylenes or high density polyethylenes which have melting points of 130° C. or higher. However, with such materials, the porosity merely commences to lessen after the battery temperature has reached 130° C. or higher and, therefore, the risk of fire or explosion caused by abnormal heating is high. Such separators are unsuitable to achieve the desired result.

Recently, a battery separator of a multilayer structure has been proposed as a means of shutting down the battery circuit under exothermic conditions. Such separator comprises a porous polymer membrane having a high melting point as the support layer and a porous polymer membrane having a low melting point as the fusible layer. The membranes are laminated so that the porous polymer membrane having a low melting point can fuse at a temperatures above its melting point to form a non-permeable layer while providing the strength of the higher melting point membrane. For example, a battery separator made of a multilayered porous polyolefin membranes is disclosed in Japanese Patent Publication (Kokai) SHO 62-10857(1987), by laminating a non-crosslinked polyethylene film on a crosslinked polyethylene film is disclosed in Japanese Patent Publication (Kokai) HEI 3-59947(1991) and of a non-woven fabric having a coating of wax thereon is disclosed in U.S. Pat. No. 4,741,979. Also, a lithium battery separator having a multilayer structure which comprises a support layer of a porous or a finely porous polymer and a fusible unwoven fabric thermally adhered to the support layer is disclosed in Japanese Patent Publication (Kokai) HEI 2-75152(1990). For reference, a schematic view of the cross section of a porous membrane having a multilayer structure formed by laminating a fusible porous polymer layer on a porous polymer layer as the support layer is illustrated in FIG. 2.

However, battery separators formed from multilayered porous polymer membranes have problems of thickness and uniformity. In small lithium batteries, the thickness of the membrane as the battery separator has to be reduced and, at the same time, made uniform in order to provide increased energy density per unit weight or volume. Stated another way, the present state of the art requires the use of porous membranes formed from polymers with high melting points (first order transition temperatures) to achieve the needed mechanical strength of the membranes in order for it to maintain its functionality as a separator. However, because it is necessary for the electrolytic conductivity to be completely blocked when the battery temperatures rise to about 130° C. it is necessary to use a material having low melting points in order to completely block the membrane pores. It is clear that the needs of high mechanical strength and of the capacity to become substantially non-porous by fusing or the like are contradictory according to present polymer technology.

Although the multilayered separator provides both strength and capacity to become substantially non-porous at prescribed temperatures, such separators have a greater thickness than desired to achieve high energy density, and may form a skin like structure of low porosity between the laminated layers at the time of lamination of the different layers of the membrane. As a result, the permeability of the multilayered membrane may be substantially reduced, lost or blocked by such a skin layer.

It is highly desired to have a single layer porous membrane which is thin, has high mechanical strength and is capable of becoming substantially non-porous at low temperatures (e.g. 80°–130° C.) without loss of mechanical strength. Such a membrane would be suitable as a separator in a battery to provide a safety means against overheating and catastrophic results therefrom

OBJECTS

It is an object of the invention to provide a single layer porous polymer membrane, suitable for a battery separator, which exhibits good mechanical strength and high porosity at normal working temperatures and is capable of becoming substantially non-porous at a predetermined elevated temperature to stop electrolytic conductivity within the battery.

It is another object of the invention to provide a battery separator for a lithium secondary battery to insure its safety against abnormal heating.

SUMMARY OF THE INVENTION

A porous membrane having a single layer structure in accordance with the invention comprises (a) a porous polymeric sheet having fine pores in its interior, said polymeric sheet being made of a first polymer having a prescribed melting point and (b) a second polymer having a melting point lower than said prescribed melting point of the first polymer. The said second polymer exist in the interior of the fine pores in such a state as not to block the fine pores but in such an amount as to block the interior of the fine pores when the membrane reaches a temperature substantially equal to or higher than the melting point of the second polymer. The membrane's porosity is substantially lost at this prescribed melting point of the second polymer.

The present invention includes a method of preparing a porous membrane having a single layer structure which comprises the steps of:

(i) melt-blending (a) a first polymer having a prescribed melting point, (b) a second polymer having a prescribed melting point lower than said melting point of the first polymer and (c) a third polymer immiscible with said first polymer and said second polymer to form a polymer membrane;

(ii) extracting only said third polymer with a solvent capable of only dissolving said third-polymer.

The present invention further encompasses a battery separator formed of the porous membrane of the present invention described hereinabove.

The present invention still further encompasses a battery having at least one cathode/anode pair, a separator between the cathode and anode and an electrolyte composition, wherein the separator is formed of the porous membrane of the present invention described hereinabove.

BRIEF DESCRIPTION OF THE DRAWINGS

FIG. 1-(a) and FIG. 1-(b) are schematic views of the states of the cross sections of a porous membrane having a single layer structure in accordance with the present invention before and after heating at a prescribed temperature, respectively. In FIG. 1-(b), the fine pore is blocked.

FIG. 4-(a) and FIG. 4-(b) are scanning electron microscopic photographs, at 5000 magnification, of the cross sections of the porous membrane having a single layer structure obtained in Example 1 of the present invention before and after heating at 115° C., respectively.

FIG. 5-(a) and FIG. 5-(b) are scanning electron microscopic photographs, at 5000 magnification, of the cross sections of the porous membrane having a single layer structure obtained in Example 2 of the present invention before and after heating at 115° C., respectively.

FIG. 6-(a) and FIG. 6-(b) are scanning electron microscopic photographs, at 2000 magnification, of the cross sections of the porous membrane having a single layer structure obtained in Example 6 of the present invention before and after heating at 100° C., respectively.

DETAILED DESCRIPTION

Figure 2:
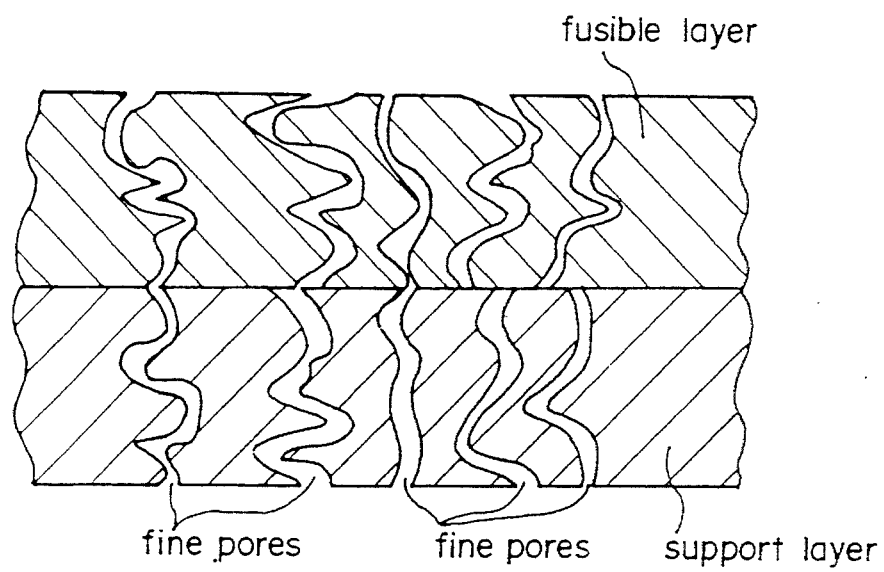
FIG. 2 is a schematic view of the cross section of a conventional porous membrane having a plurality of layers one of which is a fusible layer.

For purposes of clarity in describing the present invention, each of the following terms have the meaning stated below throughout the present description and the claims appended hereto:

"Membrane" means a sheet product having predetermined length and breath and a thickness defined by the boundaries formed by the two major surfaces of the sheet product.

"Single layer structure" means, with reference to the membrane of the present invention, a sheet product having a substantially uniform composition throughout the body or thickness of the sheet product. Such uniform composition may be formed from a single polymer or a plurality of polymers but the single layer structure is not of a laminate configuration.

"First Polymer" means a polymer or copolymer used to form the subject membrane which has a high melting point of at least about 130° C. and is inert to the other components (electrode and electrolyte compositions) of a battery contemplated for use.

"Second Polymer" means a polymer or copolymer used to form the subject membrane which has a low melting point of between 80° C. and 120° C. and is inert to the other components (electrodes and electrolyte compositions) of a battery contemplated for use.

"Melting Point" means the first order transition temperature of a polymer.

The cross section of the porous membranes of the present invention has a single layer structure. The membrane has a body extending a length and breath dimension desired to provide the needs of its end use. For example, the exact dimensions will depend on the dimensions of the battery, of the electrode plates and of the type of use (e.g. as separator in jelly-roll, as pocket separator, as plate or leaf separator). The separator has a thickness composed of a polymeric mass with channels or pores extending through the thickness from one major surface to the other. The pores need not be straight through but may be interconnecting to provide the communication between the two major surfaces. The polymeric mass of the membrane's body is composed of a uniform mixture of at least one first polymer alone or in combination with at least one second polymer.

A method of forming a single layer sheet structure having the desired properties comprises initially using a porous film, such as, for example, porous film made of the first polymer (as described herein such as, for example, a polyolefin (e.g. polypropylene). A second polymer is heated and dissolved in a solvent such as toluene or xylene, etc. and kept at that temperature. The aforementioned porous first polymer film is dipped into the heated solution, to fill the interior of the fine pores with the second polymer solution. Then, the porous polymer film whose interior of the fine pores are filled with the solution of the second polymer is dried in an air drier or the like to remove the solvent in the interior of the fine pores while leaving the second polymer residue. If the adhesive force of the second polymer to the walls of the fine pores in the porous first polymer film is deficient and the second polymer has tendency to separate from the interior walls of the pores, the film may be again heated under controlled conditions to partially melt and adhere the second polymer in the interior of the fine pores without blocking the fine pores and to raise the bonding force of the second polymer. This heating should be done at a temperature of less than the melting points of the first and second polymer.

In the aforementioned method, the concentration of the solution of the second polymer should be low so as not to cause blockage of the fine pores by the second polymer. Preferred concentration differ with the porosity, etc. of the porous first polymer film. However, any persons can readily determine the desirable concentration experimentally or by experience. Concentrations normally should be from 0.05 to 20 weight percent of the solution. For example, in case of using a porous film having a porosity of 55%, the desired concentration of the solution of the second polymer is normally from 0.1–15 weight percent.

As schematically shown in FIG. 1(a) the first polymer and the second polymer are both exposed and form a part of the walls of the membranes pores. The second polymer is in such a state and in an amount as not to block the fine pores. The second polymer is present on the wall surface and may have additional second polymer connected thereto which is part of the membrane's mass. The blocking of the fine pores of the membrane by the second polymer is done when the membrane is subjected to a temperature equal to a higher than the melting point of the second polymer. At this temperature the second polymer making up or in contact with the walls of the pores flows into the pore's channel. In this manner, the permeability of the porous membrane is lost or substantially diminished.

Under normal conditions, ions can readily migrate through the pores which are filled with electrolyte composition. Thus, electrolytic conductivity is high and the battery functions, as desired. However, when temperature rises above normal operating temperatures to indicate abnormal conditions and thereby exceed the melting point of the second polymer, the second polymer becomes a fluid sealing off the fine pores, and thus the migration of ions through the fine pores is blocked as shown in FIG. 1-(b).

A second method of forming the subject membrane comprises the steps of:

(i) melt-blending (a) a first polymer having a prescribed melting point, (b) a second polymer having a prescribed melting point lower than said melting point of the first polymer and (c) a third polymer immiscible with said first polymer and said second polymer to form a polymer membrane;

(ii) extracting only said third polymer with a solvent capable of only dissolving said third polymer.

Although not meant to be a limitation on the subject invention, it is believed that in the formation of a membrane according to this second preferred manner, the melt blend is formed into a sheet-like structure where (i) the molecules of said first polymer, second polymer and third polymer are entangled with one another to form a continuous layer or (ii) molecules of second polymer are attached onto part of the surface of the first polymer (at the boundary between first and third polymer phases) and the first and third polymer form continuous phases, respectively, and the continuous phases are entangled with each other to form a network structure.

The first polymers and second polymers described hereinbelow can be used in either method of formation and the third polymer is useful in conjunction with the second method, as more fully described hereinbelow.

Any polymer having a high enough melting point to endure the use conditions of a battery can be used as the first polymer in forming the porous polymer membrane of the present invention. The first polymer may be a homopolymer or copolymer or may be a mixture of polymers having high melting point characteristics. Polymers having high crystallinity and high tensile strength are preferred for use as a battery separator membranes. The mechanical strength or modulus may be improved by crosslinking the polymer, provided as it is not done to the extent that it adversely affect the objects of the present invention. Since it is preferred for the porous polymer membrane to have heat resistance and high mechanical strength, it is preferred that the crystallinity and molecular weight of the first polymer forming the porous polymer membrane be high and/or that physical crosslinking of the first polymer be used to impart such properties. However, if the molecular weight or the degree of crosslinking is excessive, a thin membrane may not be formed, or desired softness or resiliency of the membrane itself may not be achieved. Such treatments should be controlled and may not be desirable for some applications. The crosslinking method which can be employed in the present invention includes the conventional crosslinking methods by electron beam or radiation or with a silane coupler or a peroxide and the like.

Examples of first polymers having the properties which can be used in the present invention are of high tensile strength, good modulus, resiliency and high melting points of at least 130° C. are polyolefins, such as polypropylenes having a melting point of 130° C. and higher and a molecular weight of about 30,000 to about 800,000 polypropylenes of higher molecular weight (weight average) may also be used alone or blended with lower molecular weight polymer. Specific examples include a polypropylene having a melting point of 169° C., a melt flow index of 0.5/10 minutes and a density of 0.91 g/cm$^3$ (a product of Mitsui Nisseki Polymers Co., Ltd.), as well as such polymers sold under the trademarks "NOBLEN JS" (a product of Mitsui Toatsu Chemicals, Inc.), "CHISSOPOLYPRO" (a product of Chisso Corporation), "IDEMITSU POLYPRO" (a product of Idemitsu Petrochemical Co., Ltd.), "MITSUBISHI POLYPRO" (a product of Mitsubishi Petrochemical Co., Ltd.), and "TONEN POLYPRO" (a product of Tonen Corporation) and other polymers having the above described properties. Other polymers can be used as the first polymer including high molecular weight polyethylenes, copolymers of an olefin with an alpha-beta unsaturated monomer such as ethylene, acrylates and the like.

The second polymer which forms a fusible phase in the porous membrane of the present invention can be widely selected from polymers and copolymers having a melting point lower than the melting point of the first polymer and preferably from 95° C. to 120° C. Examples of the second polymer are low molecular polyolefins, such as polyethylenes and its copolymers including low density polyethylenes such as those sold under the tradenames "MITSUBISHI POLYETHYLENE-LD" (a product of Mitsubishi Kasei Corporation), "MIRASON" (a product of Mitsui Petrochemical Industries, Ltd. ) , "SUMIKATHENE" (a product of Sumitomo Chemical Co., Ltd. ), "ULTZEX" (a product of Mitsui Petrochemical Industries, Ltd.), "FLO-THENE" (a product of Sumitomo Seika Chemicals Co., Ltd.), "NIS-SEKI REXLON" (a product of Nippon Petrochemical Co., Ltd. ); linear low density polyethylenes such as "SUMIKA-THENE-L" (a product of Sumitomo Chemical Co., Ltd.), "IDEMITSU POLYETHYLENE-L" (a product of Idemitsu Petrochemical Co., Ltd.), "LINIREX" (a product of Nippon Petrochemical Co., Ltd.) and ethylene/vinyl acetate copolymers, ethylene/butadiene copolymers, ethylene/pentadiene copolymers, ethylene/methacrylic acid copolymers, ethylene/acrylate copolymers, ethylene/methacrylate copolymers, ethylene/propylene copolymers, ethylene/propylene/diene terpolymers and terpolymers of ethylene, maleic anhydride and another monomer.

The above described first polymer and the second polymer may be appropriately selected and combined to form a porous membrane having a single layer structure of the present invention. The selection can be readily made by one skilled in the art based on the stability of both polymers at ordinary operating conditions and on the second polymer having a melting point at the desired temperature where loss of ion permeability is desired. For example, when the porous membrane of the present invention is used as the separator for a lithium battery, use of polypropylene having a melting point of 130° C. or higher as the first polymer and a low molecular weight polyethylene having a melting point of about 95°–120° C. as the second polymer will create a useful battery separator having a preferred mechanical strength of the battery separator itself and its permeability can be quickly lost at a prescribed critical temperature to prevent catastrophic destruction of the battery and the fixture it is used with.

The ratio of first polymer and second polymer forming the present porous membrane has to be such that the fine pores of the porous membrane will not be blocked by the second polymer under the normal condition but can be blocked by the second polymer upon exceeding a determined safe temperature. While such a desirable ratio may change depending on the thickness of the porous membrane, the size and the shape of the fine pores in the porous membrane, the method of preparation of the porous membrane and the method of introducing the second polymer in the fine pores, any person skilled in the art can decide the optimal ratio by experiment. The weight ratio of first polymer to second polymer should generally be from 1:1 to 9:1 and preferably from 1:1 to 8:1. For example, when the porous membrane having a porosity of 50% and a thickness of 25 μm is used, the weight ratio of the first polymer to the second polymer is preferably 1:1 to 4:1.

Further, if necessary or desired, various kinds of additives such as antioxidants, UV absorbers, colorants, lubricants and/or antiblocking agents may be added to the polymeric composition forming the subject membrane. These can be added to either the first polymer or the second polymer during the process of forming the subject sheet product within amounts not to adversely affect the present invention. Such amounts are normally up to about 5 wt. percent of the resultant composition and preferably up to about 1 wt. percent.

In order to increase the adhesion of the first polymer to the second polymer, copolymers of an olefin and an unsaturated carboxylic acid may be added to the composition as part of the initial polymer mixture. Examples of such copolymers are commercially sold under the tradenames of "BOND-INE" (a product of Sumitomo Chemical Co,, Ltd.), "YUKARON" (a product of Mitsubishi Petrochemical Co., Ltd.), "ADMER" (a graft copolymer of a polyolefin, a product of Mitsui Petrochemical Industries, Ltd.), "SUMI-FARM" (a product of Sumitomo Chemical Co., Ltd.), and "REUBEX" (a product of Asahi Chemical Industry Co., Ltd.). Such copolymers may be added for adhesion purposes in amounts of up to 10% preferably up to 5% by weight.

Various methods such as those described hereinabove can be employed for preparing the porous membrane having a single layer structure of the present invention. The preferred second method is described below.

A first polymer and a second polymer which are to constitute the porous membrane and a third polymer which is immiscible with the first polymer and the second polymer (as fully described hereinbelow) are melt-blended and the melt blend is formed into a film having an interpenetrating polymer network structure (hereinafter referred to as "IPN structure") where the molecules of the second polymer is attached onto part of the surface of said first polymer and such first polymer and said third polymer form continuous phases, respectively, and the continuous phases are entangled with each other to form a network structure. The film can be formed by known techniques such as casting, extrusion and the like. Subsequent to the film formation, the third polymer is extracted with a solvent capable of only dissolving the third polymer to give a porous sheet having a single layer structure of the present invention. A schematic view of the IPN structure is illustrated in Takashi Inoue and Shoji Ichihara, "POLYMER ALLOY" (edited by the Society of Polymer Science, Japan, published by Kyoritsu Shuppan), page 3, FIG. 1.3.

The third polymer can be selected from polymers that are immiscible with the first polymer and the second polymer forming the present porous membrane, can form an IPN structure with the first polymer and can be removed by extraction with a specific type of solvent. The term "a specific type of solvent" means such types of solvents that can dissolve only the third polymer without dissolving the first polymer and the second polymer at a prescribed processing temperature which is below the melting point of the first polymer and second polymer, preferably at least 30° C. below the lowest of said melting point, and most preferably from ambient temperature to 60° C. Any person skilled in the art can decide, experimentally and by experience, the specific type of solvents which can be used as the solvent for third polymer and its combination which can be used for a specific combination of the first polymer and the second polymer. Examples of the third polymer which can be used in the present invention are styrene/hydrogenated butadiene/styrene block polymers (herein referred to as "SEBS") having a number average molecular weight of from about 10,000 to 300,000 including "KRATON G" (a product of Shell Chemical Co.); styrene/hydrogenated isoprene/styrene block copolymers (herein referred to as "SEPS") having a number average molecular weight of from about 10,000 to 300,000 and styrene/hydrogenated isoprene block copolymers having a number average molecular weight of from about 5,000 to 200,000.

When, for example, the SEBS or the SEPS is melt-blended with polyolefins such as polypropylene and polyethylene, it forms an IPN structure. By extracting the SEBS or the SEPS alone with a certain specific type of solvents after formation of a film from the melt blend, a porous membrane having through-pores can be prepared. The solvents which can be used for the styrene/hydrogenated butadiene/styrene block polymer, the styrene/hydrogenated isoprene/styrene block polymer and the styrene/hydrogenated isoprene block polymer are solvents having a solubility parameter of 7.5 to 9.3 including, for example, toluene, xylene, cyclohexane, methylcyclohexane, methylethylketone, carbon tetrachloride and chloroform.

Although a typical example of the methods of preparing the film made of the first polymer, the second polymer and the third polymer is described above, other conventional film-forming techniques such as inflation method, casting method and extrusion method through a T-die or the like may also be employed. Further, in order to increase the mechanical strength of the porous membrane obtained as the final product, the film may be stretched at a temperature higher than the second order transition point of the first polymer but lower than its melting point and, if necessary or desired, the film thus stretched may be annealed at a temperature higher than the stretching temperature to relax the residual stress in the interior of the film. The stretching ratio which can be employed in the present invention is typically 1.1 to 10 times, preferably 1.1 to 5 times. The stretching can be done prior to or after (preferably) extraction of the third polymer from the formed sheet.

The porosity of the porous membrane of the present invention is typically not greater than 80%. When the porosity is greater than 80%, the mechanical strength of the porous membrane is drastically decreased and thus, the porous membrane cannot be used for practical purposes. Furthermore, if the porosity is greater than 80%, a larger amount of the second polymer has to be used to block the fine pores of the porous polymer layer by fusing the second polymer, and accordingly completely loses the balance of the composition of the first polymer and the second polymer and, as a result, the majority of the porous membrane will be made of the second polymer. Thus, the mechanical strength of the porous membrane cannot be insured for various applications.

When the porous membrane of the present invention is used as a battery separator, the porosity is typically 30% to 80%, preferably 40% to 70%. When the porosity is smaller than 30%, it is highly possible to reduce the maintenance of an electrolyte solution in the separator membrane and cause it to have a dried-up state. On the other hand, when the porosity is greater than 80%, the mechanical strength of the porous membrane is too low for practical purposes, and also short circuit easily occurs by the piercing and pressing of the dendrites formed on the cathode.

The porosity of the porous membrane of the present invention can be regulated by the amount of the third polymer which will form pores after the extraction of the third polymer from the film made of the first polymer, second polymer and third polymer. It is preferred that the amount of the third polymer used in forming the initial sheet be from 0.5 to 9 times by weight as much as the sum of the weight amount of the first and second polymers. When the amount is less than 0.5 of the total amount of the first and second polymers, a desired porosity cannot be obtained. On the other hand, when the amount of the third polymer is greater than 9 times by weight with respect to the total amount of the first and second polymers, the mechanical strength of the resultant porous membrane is normally too low for practical purposes.

Furthermore, in order to increase the porosity, the film formed of the first polymer, the second polymer and the third polymer can be subjected to annealing at a temperature lower than the melting point of the second polymer. As a result of this annealing, the stress of each polymer at the formation of the film is relaxed to reduce shrinkage in the vertical direction of the porous membrane after the extraction of third polymer from the sheet.

The average pore size of the porous membrane varies depending on its applications and is typically 0.05 µm to 10 µm. When the porous membrane is used as a battery separator, the average pore size is preferably 0.1 µm to 5 µm. When the average pore size is less than 0.05 µm, the electrical resistance is increased causing a battery to have low functionality. On the other hand, when the average pore size is greater than 10 µm, the possibility of short circuit due to the formation of dendrites rapidly increases.

The pore size of the porous membrane is determined by how finely the third polymer is dispersed in the mixture of the first polymer and the second polymer at the time of melt-blending, i.e., by how small the structural element of each polymer can be made. This is due to the formation of pores after the extraction of the third polymer from the film formed of the first, second, and third polymers. Accordingly, the pore size of the porous membrane can be regulated by the temperature and the shearing stress at the time of melt-blending and the melt viscosities of the first polymer, second polymer and third polymer. For example, when the first polymer, second polymer and third polymer are melt-blended by a kneader at a lower temperature where the melt viscosity of each polymer is in an increased state, the pore size of the porous membrane becomes smaller. On the other hand, when the melt-blending is conducted at an elevated temperature, the pore size becomes larger. When the shearing stress is increased during melt-blending, the pore size becomes smaller while when the shearing stress is decreased, the pore size becomes larger. Furthermore, when a higher molecular weight third polymer is used as the third polymer to increase the melt viscosity, porous membranes having smaller pore size can be obtained. On the other hand, when a lower molecular weight polymer is used as the third polymer to decrease the melt viscosity, porous membrane having larger pore size can be obtained. As stated above, the pore size of the porous membrane of the present invention can easily be varied depending on the above described factors selected.

The thickness of the porous membrane of the present invention may vary depending on its applications and is typically 15 µm to 200 µm. A preferred thickness is 20 µm to 120 µm. When the porous membrane is used as a battery separator, the thickness of the porous membrane is typically 15 µm to 200 µm, preferably 20 µm to 120 µm. When the thickness is smaller than 15 µm, the mechanical strength of the separator is remarkably decreased to easily cause the occurrence of short circuit by dendrites pressed or pierced. On the other hand, when the thickness is greater than 200 µm, the occupying volume of the battery separator within the battery is increased and this decreases its ability to meet market demands such as miniaturization and high energy density.

Various types of batteries can be prepared by using the battery separator of the present invention. The battery separator of the present invention is of particular use for the battery which has to substantially shut off the flow route of electric current to prevent the risk of fire or explosion when the temperature within the battery abnormally has risen above a prescribed temperature.

In this respect, at present, the usefulness of the battery separator of the present invention will be most effectively shown in a lithium battery which employs an organic electrolyte solution. The combinations of the cathode materials, the anode materials and the electrolyte solutions to be employed in lithium batteries are well known to those skilled in the art and the battery separator of the present invention can be used for any combinations of such constituent elements. A preferred organic electrolyte solution which can be used in the lithium battery is a solution prepared by dissolving lithium perchlorate in a mixture of propylene carbonate and 1,2-dimethoxyethane. Preferred combinations of other organic solvents and electrolytes can be selected from organic solvents of propylene carbonate, dimethoxyethane, dioxolane, tetrahydrofuran, 1,2-dimethoxypropane and other organic solvents which can be used for the fabrication of a battery having a conventional lithium anode and lithium salts which are dissolved in such solvents include lithium trifluoromethasulfonate ($CF_3SO_3Li$), $LiAsF_6$, $LiBF_4$ and $LiClO_4$. Examples of useful anode materials include lithium metal, lithium salts contained in a solid carrier (such as carbon or the like), lithium/aluminum alloy, lithium/silicon alloy, lithium/boron alloy and metals of Group IA and IIA of the Periodic Table. Examples of the metal which can be used as the current collector and support member include nickel, stainless steel, aluminum and titanium. A wide range of cathode active materials are known and include chalcogenides, such as $MnO_2$, TiS $FeS_2$, FeS, $MoS_2$, CuO, $V_6O_{13}$, $Bi_2O_3$ in a variety of carriers such as polyfluoro carbons and polyolefins. The battery separator of the present invention can also be used for batteries other than the lithium batteries.

The examples which follow are given for illustration purposes and are not meant to limit the invention.

In the following examples the thickness of the porous membrane was measured by a dial gauge, and the average pore size was determined from the scanning electron microscopic photographs of the surface and the cross section of the porous membrane. The porosity of the porous membrane was obtained by cutting a porous membrane into a size of 20 mm×20 mm, immersing the sample in n-butyl alcohol, measuring the weight of the immersed sample and the weight of the absolutely dried sample and conducting calculation from these weights according to the following formula.

Porosity=(Pore volume/Volume of porous membrane)×100 wherein

Pore volume=(Weight of porous membrane containing n-butyl alcohol—Weight of absolutely dried porous membrane)/0.81

Figure 3:
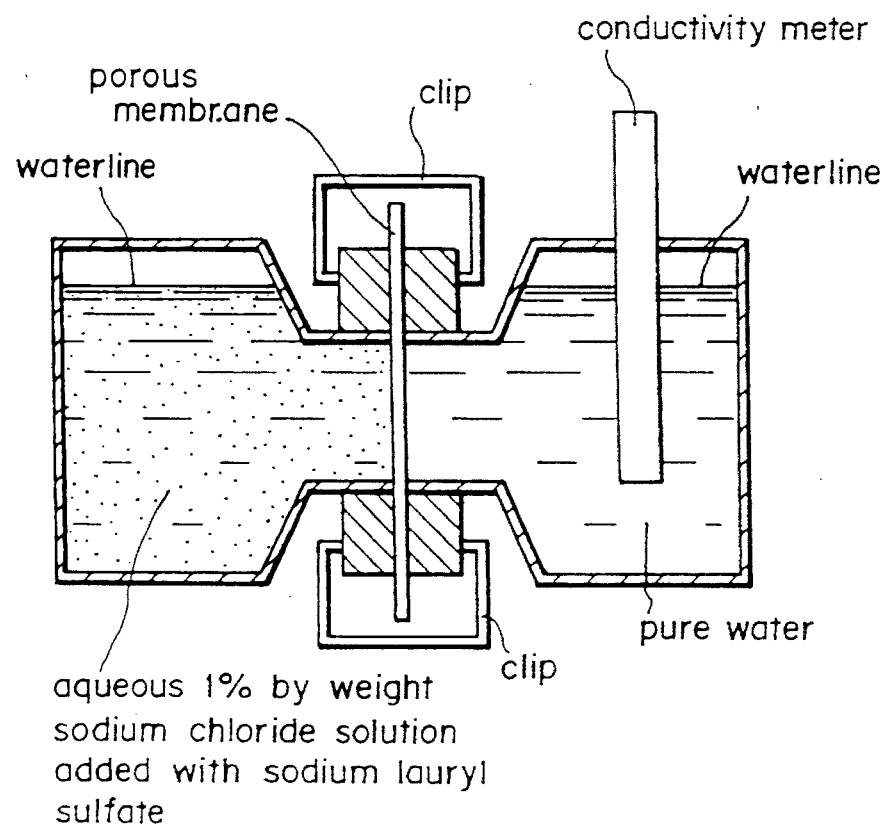
FIG. 3 is a schematic view of the cross section of a device for measuring the ion permeability of a porous membrane having a single layer structure in accordance with the present invention.

Blockage of the fine pores of the tested porous membranes due to the second polymer component was judged by comparing the ion permeabilities of the porous membrane before and after heating at a prescribed temperature. More specifically, after the porous membrane was heated at a prescribed temperature for a specific period of time, the porous membrane was fixed between two chambers of the device, as shown in FIG. 3. In one chamber of the device, 50 cc of pure water were introduced and in the other chamber 50 cc of a 1% by weight aqueous sodium chloride solution with sodium lauryl sulfate in an amount to reduce the solution's surface tension below the critical surface tension of the porous membrane. Due to the difference in concentration between these two solutions, ions migrated to the pure water through the porous membrane. This migration of ions into the pure water was measured by a conductivity meter with the respect to time. The ion permeabilities of the porous membrane before and after heating at the prescribed temperature were compared in order to judge whether the migration of ions after heating was blocked or not. In addition, the cross sections of the tested porous membranes were observed by a scanning electron microscope before and after heating at the prescribed temperature to judge whether or not the pores were blocked by fusion of the second polymer.

EXAMPLE 1

50 parts of a polypropylene having a melting point of 169° C., a melt flow index of 0.5/10 minutes and a density of 0.91 g/cm³ (a product of Mitsui Nisseki Polymers Co., Ltd.), 50 parts of a low density polyethylene having a melting point of 109° C., a melt flow index of 7.0 g/10 minutes and a density of 0.917 g/cm³ (a product of Nippon Petrochemicals Co., Ltd.) and 100 parts of a styrene/hydrogenated isoprene/styrene block polymer having a melt flow index of 4 g/10 minutes and a density of 0.93 g/cm³ ("SEPTON 2007", a product of Kuraray Co., Ltd.) were thoroughly melt-blended at a temperature of 200° C. to 220° C. by a kneader, and then the melt blend was extruded through a T-die to form a film. The film thus obtained was then pressed at 180° C. at a pressure of 200 kg/cm² for one minute to form a 150 μm-thick film. This film was immersed in cyclohexane to completely extract the styrene/hydrogenated isoprene/styrene block polymer, and further its surface was washed with fresh cyclohexane to give a porous membrane having a single layer structure made of polypropylene and polyethylene. From the change in weight before and after the extraction, this membrane showed a decrease of weight equal to the content of the styrene/hydrogenated isoprene/styrene block polymer. Also, the IR analysis of the formed porous membrane showed the absence of the styrene component. Thus, it was confirmed that a porous membrane having a single layer structure made of polypropylene and polyethylene was obtained. The properties of the porous membrane thus obtained are shown in Table 1 and the ion permeabilities of the porous membrane are shown in Table 2. It was found from the results shown in Table 2 that the porous membrane heated at 115° C. lost its permeability. The scanning electron microscopic photographs of the cross sections of the porous membrane before and after heating at 115° C. are shown in FIG. 4-(*a*) and FIG. 4-(*b*), respectively. It can be observed from these photographs that the fine pores in the porous membrane are blocked.

EXAMPLES 2 TO 4

The same procedures of Example 1 were repeated except that the amounts of polypropylene, polyethylene and the block polymer were altered to achieve the porous membranes described in Table 1. The membranes, after extraction, did contain styrene/hydrogenated isoprene/styrene block polymer and their properties are shown in Table 1 and the ion permeabilities are shown in Table 2.

The scanning electron microscopic photographs of the cross sections of the porous membrane of Example 2 taken before and after heating at 115° C. 2 are shown in FIG. 5-(a) and FIG. 5-(b), respectively.

EXAMPLE 5

The same procedures of Example 1 were repeated except that 70 parts of the polypropylene were employed instead of the polypropylene and 30 parts of a polyethylene having a melt flow index of 100 g/10 minutes and a density of 0.914 g/cm$^3$ (a product of Tosoh Corporation) were employed instead of the polyethylene.

As a result, a porous membrane was obtained having a single layer structure made of polypropylene and polyethylene free from the styrene/hydrogenated isoprene/styrene block polymer. The properties of the porous membrane thus obtained are shown in Table 1 and the ion permeabilities of the porous membrane are shown in Table 2. It can be observed from the results shown in Table 2 that the porous membrane substantially lost its ion permeability after being subjected to 105° C. and 115° C.

EXAMPLE 6

80 parts of a polypropylene having a melting point of no less than 130° C. (a product of Mitsui Nisseki Polymers Co., Ltd.), 20 parts of a low density polyethylene having a melting point of 104° C. ("FLO-THENE G801", a product of Sumitomo Seika Chemicals Co., Ltd.) and 100 parts of a styrene/hydrogenated isoprene/styrene block polymer ("SEPTON 2006", a product of Kuraray Co., Ltd.) were thoroughly melt-blended at 220° C. in a kneader and then the melt blend was extruded through a T-die to form a film. The film thus obtained was immersed in cyclohexane for one hour to completely extract the styrene/hydrogenated isoprene/styrene block polymer, and further its surface was washed with fresh cyclohexane to obtain a porous membrane. From the change in weight before and after the extraction, this membrane showed a decrease of weight equal to the content of the styrene/hydrogenated isoprene/styrene block polymer. Also, the IR analysis showed the absence of the styrene component. Thus, it was confirmed that a porous membrane having a single layer structure made of polypropylene and polyethylene was obtained.

The properties of the porous membrane thus obtained are shown in Table 1.

When the porous membrane was immersed in propylene carbonate which is a poor solvent for the polyolefins and then the porous membrane thus treated was heated at 100° C., the observation of the cross section of the porous membrane by the scanning electron microscope revealed that the state of the interior of the fine pores changed before and after the heating and the fine pores were blocked. The scanning electron microscopic photographs of the cross sections of the porous membrane before and after the heating are shown in FIG. 6-(a) and FIG. 6-(b), respectively. The ion permeabilities of the porous membrane are shown in Table 2. It can be observed from the results shown in Table 2 that the porous membrane after being heated at 115° C. substantially lost its ion permeabilities.

EXAMPLE 7

80 parts of a polypropylene having a melt flow index of 1.7/10 minutes and a melting point of 170° C. ("NOBLENJS", a product of Mitsui Toatsu Chemicals, Inc.), 20 parts of a low density polyethylene having a melting point of 100° C. ("MIRASON ACE 30N", a product of Mitsui Petrochemical Industries, Ltd.) and 100 parts of the same styrene/hydrogenated isoprene/styrene block polymer as in Example 1 were thoroughly melt-blended at 220° C. in a kneader and the melt blend was extruded through a T-die to form a film. Then, the film was stretched twice in the machine direction, annealed at 100° C. and quenched. The film thus obtained was immersed in cyclohexane for one hour to completely extract the styrene/hydrogenated isoprene/styrene block polymer and further its surface was washed with fresh cyclohexane to give a porous membrane having a single layer structure made of polypropylene and polyethylene. The properties of the porous membrane thus obtained are shown in Table 1. When the porous membrane was immersed in propylene carbonate and the membrane thus treated was heated at 100° C., the observation of the cross section of the porous membrane by the scanning electron microscope revealed that the state of the interior of the fine pores changed before and after the heating and the fine pores were blocked once heated. The ion permeabilities of the porous membrane are shown in Table 2. It can be observed from the results shown in Table 2 that the porous membrane after being heated at 115° C. substantially lost its ion permeabilities.

TABLE 1

Properties of Porous Membranes

| Example No. | Polypropylene (weight %) | Polyethylene (%) | Porosity (%) | Average Pore Size (μm) | Thickness of Membrane (μm) |
|---|---|---|---|---|---|
| 1 | 50 | 50 | 33.2 | 1 | 120 |
| 2 | 60 | 40 | 38.9 | 0.8 | 120 |
| 3 | 70 | 30 | 40.8 | 0.8 | 120 |
| 4 | 80 | 20 | 45.2 | 0.8 | 120 |
| 5 | 70 | 30 | 35.6 | 0.9 | 120 |
| 6 | 80 | 20 | 50.0 | 1.2 | 100 |
| 7 | 80 | 20 | 50.0 | 1.2 | 100 |

TABLE 2

Change in Conductivity of Porous Membrane with Progression of Time before and after Heating

| Example No. | Heating Condition* | Conductivity (mS/cm) Progress of Time (hour) | | | |
|---|---|---|---|---|---|
| | | 0 | 1 | 2 | 3 |
| 1 | Before Heating | 1.24 | 303 | 619 | 894 |
| | After Heating at 115° C. | 1.24 | 6.55 | 5.14 | 5.47 |
| 2 | Before Heating | 1.42 | 177 | 368 | 543 |
| | After Heating at 105° C. | 0.77 | 3.82 | 7.8 | 11.05 |
| | Before Heating | 1.42 | 145 | 338 | 514 |
| | After Heating at 115° C. | 0.77 | 2.53 | 2.93 | 3.76 |
| | Before Heating | 1.42 | 276 | 593 | 903 |
| | After Heating at 130° C. | 0.77 | 5.72 | 4.85 | 4.87 |
| 3 | Before Heating | 1.42 | 211 | 407 | 590 |
| | After Heating at 105° C. | 0.77 | 59.8 | 124 | 195 |
| | Before Heating | 1.42 | 159 | 351 | 504 |
| | After Heating at 115° C. | 0.77 | 11.3 | 29.6 | 44.9 |
| | Before Heating | 0.77 | 127 | 276 | 415 |
| | After Heating at 130° C. | 0.77 | 9.74 | 7.58 | 11.35 |
| 4 | Before Heating | 1.51 | 290 | 630 | 888 |

TABLE 2-continued

Change in Conductivity of Porous Membrane
with Progression of Time before and after Heating

| Example No. | Heating Condition* | Conductivity (mS/cm) Progress of Time (hour) | | | |
|---|---|---|---|---|---|
| | | 0 | 1 | 2 | 3 |
| | After Heating at 120° C. | 1.3 | 222 | 496 | 689 |
| | Before Heating | 1.51 | 306 | 760 | 1112 |
| | After Heating at 140° C. | 1.9 | 165 | 382 | 610 |
| 5 | Before Heating | 1.25 | 229 | 430 | 705 |
| | After Heating at 105° C. | 1.62 | 12 | 21.7 | 31.7 |
| | Before Heating | 1.25 | 189 | 347 | 547 |
| | After Heating at 115° C. | 1.25 | 14.2 | 20.2 | 28.5 |
| | Before Heating | 1.62 | 205 | 394 | 580 |
| | After Heating at 130° C. | 1.39 | 54.8 | 125 | 202 |
| 6 | Before Heating | 1.30 | 386 | 801 | 1179 |
| | After Heating at 115° C. | 1.30 | 5.44 | 8.09 | 12.4 |
| 7 | Before Heating | 1.15 | 377 | 755 | 1168 |
| | After Heating at 115° C. | 1.17 | 11.2 | 14.5 | 18.5 |

*Heating Time: One minute in Examples 1, 2, 3, 5, 6 and 7
Ten minutes in Example 4

What is claimed is:

1. A battery separator comprising a single layer porous membrane having length and breadth dimensions and a thickness between its two major surfaces with micropores in said thickness and in communication with each of said major surfaces wherein the porous sheet is composed of a substantially uniform mixture of a first polymer having a predetermined melting point and a second polymer having a melting point which is at least 10° C. lower than the predetermined melting point of the first polymer; the pores of said porous sheet have walls composed of said first polymer and second polymer; and said second polymer forms a part of the walls of the pore in an amount capable of blocking said pores upon subjection of the membrane to a temperature at least equal to the melting point of the second polymer to substantially reduce the permeability of said membrane.

2. The separator of claim 1, wherein said first polymer has a melting point of at least 130° C., and said second polymer has a melting point of 80° C. to 120° C.

3. The separator of claim 2, wherein said first polymer is a polypropylene having a weight average molecular weight of 30,000 to 800,000.

4. The separator of claim 2, wherein said second polymer is a polyethylene having a melting point of 95° C. to 120° C.

5. The separator of claim 1 wherein the second polymer has a melting point of from 80° C.–120° C. and is selected from low density polyethylene, linear low density polyethylene, ethylene/vinylacetate copolymer, ethylene/butadiene copolymer, ethylene/acrylate or alkacrylate copolymer, ethylene/acrylic or alkacrylic acid copolymer, ethylene/propylene copolymer or mixtures thereof.

6. The separator of claim 2 wherein the porosity is from 30 to 80 vol. percent of the membrane, and the average pore diameter is from 0.05 μm to 10 μm.

7. A battery separator comprising a porous membrane having length and breadth dimensions and a thickness between its two major surfaces with micropores in said thickness and in communication with each of said major surfaces, wherein the porous membrane is composed of a first polymer having a predetermined melting point (first order transition temperature) and the pores of said porous membrane have walls partially coated with a second polymer having a melting point which is at least 10° C. lower than the predetermined melting point of the first polymer and said second polymer is present on said walls in a state as to permit free permeability through said pores between said major surfaces and in an amount capable of blocking said pores upon subjection of the membrane to a temperature at least equal to the melting point of the second polymer.

8. The separator of claim 7, wherein said first polymer has a melting point of at least 130° C. and said second polymer has a melting point of 80° C. to 120° C.

9. The separator of claim 8 wherein said first polymer is a polypropylene having a weight average molecular weight of 30,000 to 800,000.

10. The separator of claim 8, wherein said second polymer is a polyethylene having a melting point of 95° C. to 120° C.

11. The separator of claim 7 wherein the second polymer has a melting point of from 80° C.–120° C. and is selected from low density polyethylene, linear low density polyethylene, ethylene/vinyl acetate copolymer, ethylene/butadiene copolymer, ethylene/acrylate or alkacrylate copolymer, ethylene/acrylic or alkacrylic acid copolymer, ethylene/propylene copolymer or mixtures thereof.

12. A battery having at least one negative electrode/ positive electrode pair, an electrolyte composition and a separator membrane between each negative electrode and positive electrode, wherein said separator membrane comprises a single layer porous membrane having length and breadth dimensions and a thickness between its two major surfaces with micropores in said thickness and in communication with each of said major surfaces wherein the porous sheet is composed of a substantially uniform mixture of a first polymer having a predetermined melting point and a second polymer having a melting point which is at least 10° C. lower than the predetermined melting point of the first polymer; the pores of said porous sheet have walls composed of said first polymer and second polymer; and said second polymer forms a part of the walls of the pore in an amount capable of blocking said pores upon subjection of the membrane to a temperature at least equal to the melting point of the second polymer to substantially reduce the permeability of said membrane.

13. The battery of claim 12, wherein said first polymer of the separator has a melting point of at least 130° C., and said second polymer of the separator has a melting point of 80° C. to 120° C.

14. The battery of claim 13, wherein said first polymer of the separator is a polypropylene having a weight average molecular weight of 30,000 to 800,000.

15. The battery of claim 13, wherein said second polymer of the separator is a polyethylene having a melting point of 95° C. to 120° C.

16. The battery of claim 12 wherein the second polymer of the separator has a melting point of from 80° C.–120° C. and is selected from low density polyethylene, linear low density polyethylene, ethylene/vinylacetate copolymer, ethylene/butadiene copolymer, ethylene/acrylate or alkylacrylate copolymer, ethylene/acrylic or alkacrylic acid copolymer, ethylene/propylene copolymer or mixtures thereof.

17. The battery of claim 13 wherein the separator has a porosity of from 30 to 80 vol. percent of a separator membrane, and the average pore diameter of from 0.05 μm to 10 μm.

18. A battery having at least one negative electrode/positive electrode pair, an electrolyte composition and a separator membrane between each negative electrode and positive electrode, wherein said separator membrane comprises a porous membrane having length and breadth dimensions and a thickness between its two major surfaces with micropores in said thickness and in communication with each of said major surfaces, wherein the porous membrane is composed of a first polymer having a predetermined melting point (first order transition temperature) and the pores of said porous membrane have walls partially coated with a second polymer having a melting point which is at least 10° C. lower than the predetermined melting point of the first polymer and said second polymer is present on said walls in a state as to permit free permeability through said pores between said major surfaces and in an amount capable of blocking said pores upon subjection of the membrane to a temperature at least equal to the melting point of the second polymer.

19. The battery of claim 18, wherein said first polymer of the separator has a melting point of at least 130° C., and said second polymer of the separator has a melting point of 80° C. to 120° C.

20. The battery of claim 19 wherein said first polymer of the separator is a polypropylene having a weight average molecular weight of 30,000 to 800,000.

21. The battery of claim 19, wherein said second polymer of the separator is a polyethylene having a melting point of 95° C. to 120° C.

22. The battery of claim 16 wherein the second polymer of the separator has a melting point of from 80° C.–120° C. and is selected from low density polyethylene, linear low density polyethylene, ethylene/vinyl acetate copolymer, ethylene/butadiene copolymer, ethylene/acrylate or alkacrylate copolymer, ethylene/acrylic or alkacrylic acid copolymer, ethylene/propylene copolymer or mixtures thereof.

23. The battery of claim 17 wherein the separator has a porosity of from 30 to 80 vol. percent of the separator membrane, and an average pore diameter of from 0.05 μm to 10 μm.

24. The battery of claims 12, 13, 14, 15, 16, 17, 18, 19, 20, 21, 22 or 23 wherein the anode is lithium metal, lithium salt in a solid carrier or lithium alloys.

* * * * *